United States Patent
Randle et al.

(10) Patent No.: US 11,643,919 B2
(45) Date of Patent: May 9, 2023

(54) WELLBORE OBSERVATION SYSTEM

(71) Applicant: Spoked Solutions LLC, Houma, LA (US)

(72) Inventors: Bryce Elliott Randle, Highlands Ranch, CO (US); Shane Joseph Triche, Houma, LA (US); Heath Lawrence Triche, Gray, LA (US)

(73) Assignee: Spoked Solutions LLC, Houma, LA (US)

( * ) Notice: Subject to any disclaimer, the term of this patent is extended or adjusted under 35 U.S.C. 154(b) by 0 days.

(21) Appl. No.: 17/202,072

(22) Filed: Mar. 15, 2021

(65) Prior Publication Data

US 2021/0270122 A1 Sep. 2, 2021

Related U.S. Application Data

(63) Continuation of application No. 16/140,242, filed on Sep. 24, 2018, now Pat. No. 10,947,832.

(60) Provisional application No. 62/562,169, filed on Sep. 22, 2017.

(51) Int. Cl.
*E21B 47/002* (2012.01)
*E21B 47/017* (2012.01)
*G01C 7/06* (2006.01)

(52) U.S. Cl.
CPC .......... *E21B 47/002* (2020.05); *E21B 47/017* (2020.05); *G01C 7/06* (2013.01)

(58) Field of Classification Search
CPC .............................. E21B 47/002; E21B 47/017
See application file for complete search history.

(56) References Cited

U.S. PATENT DOCUMENTS

| | | | | |
|---|---|---|---|---|
| 2,677,996 A | * | 5/1954 | Laval, Jr. | E21B 47/002 396/25 |
| 2,812,697 A | * | 11/1957 | Laval, Jr. | E21B 47/002 396/326 |
| 2,908,332 A | * | 10/1959 | Nedow | E21B 27/00 166/99 |
| 2,982,191 A | * | 5/1961 | Laval, Jr. | G03B 37/005 396/25 |
| 4,800,104 A | * | 1/1989 | Cruickshank | B08B 9/0436 118/503 |
| 5,903,306 A | * | 5/1999 | Heckendorn | G03B 37/005 348/42 |
| 6,145,583 A | * | 11/2000 | Gay | F22B 37/002 165/95 |
| 2012/0048560 A1 | * | 3/2012 | Soni | E21B 37/00 166/173 |

* cited by examiner

*Primary Examiner* — Caroline N Butcher
(74) *Attorney, Agent, or Firm* — Heuton IP Law, LLC

(57) ABSTRACT

An apparatus, system and/or method for making observations down a wellbore are provided. The wellbore observation system may comprise a mandrel that can be run downhole, and telescoping tracks can be utilized to move a camera and semi-conforming inflatable bladder out of the mandrel and into the wellbore. Once the bladder is inflated, it displaces high turbidity fluid in the wellbore to allow the camera to move about a track and observe the wellbore unobstructed. An alternative embodiment allows the mandrel and telescoping tracks to be utilized with other tools to perform cleaning, fishing, diagnostic, and analytic operations.

20 Claims, 4 Drawing Sheets

WELLBORE OBSERVATION SYSTEM

CROSS REFERENCE TO RELATED APPLICATION

This application is a continuation of U.S. patent application Ser. No. 16/140,242, filed on Sep. 24, 2018, which claims the benefit of U.S. Provisional Application No. 62/562,169, filed on Sep. 22, 2017, which are incorporated herein by reference in their entireties.

FIELD OF THE INVENTION

The present invention relates to an apparatus, system and method for making observations down a wellbore, specifically, telescoping cameras that make observations from a tubular structure down a wellbore.

SUMMARY OF THE INVENTION

Embodiments of the present invention can include a wireline adaptable mandrel designed to house a telescoping camera. Within the mandrel are four distinct features or functions: the reservoir, the expandable bladder, the telescoping track, and the camera track.

First, the reservoir is a fluid compartment within the system that houses a fluid such as a clear oil-based fluid capable of maintaining water-like clarity at temperatures between 30° F. and 300° F. The reservoir can include an electric pump and sensors to move fluid from the reservoir to the expandable bladder. The system can also include several servo motors to telescope the tracks and to push and retract the provided camera relative to the camera track such that the camera may traverse the expandable bladder once the bladder is inflated. Once images are captured and the camera has been retracted, the reservoir then accepts the returning fluid from the expandable bladder and returns to a pre-deployment state.

Second, the expandable bladder can be a transparent, elastic and highly abrasion resistant polymer that is resistant to puncture. The bladder can be designed to expand and to semi-conform to the internal diameter of the body the bladder is within. For example, the bladder can be deployed in a wellbore, a casing, a production tubular, etc. The objective of a semi-conformation is to prevent the bladder from being completely extruded through large breaches in casing or perforations. In some embodiments, the bladder can be designed to achieve a length of approximately 10 ft. In other embodiments, the bladder may be designed to achieve greater or shorter lengths to meet the needs of a particular application.

Third, the telescoping track is the platform by which the camera and expandable bladder are deployed from the mandrel. The telescoping track rests inside of the mandrel while running in hole and when traversing between inspection points. Once the telescoping track is fully deployed (approximately 10 feet in some embodiments), the expandable bladder can then be inflated to permit the camera to move forward and backwards as desired by the camera operator. In other embodiments, the telescoping track may be designed to achieve greater or shorter lengths to meet the needs of a particular application.

Fourth, the camera track is the platform by which the camera may move forward and back (approximately 8 feet in some embodiments) within the bladder. The camera track rests inside of the mandrel during deployment and retrieval. Once the bladder is expanded, the camera track permits the camera to move to any position along the track as desired by the camera operator. When inspection is complete, the bladder is deflated and both the camera and the camera track return to within the mandrel for moving further downhole or to be retrieved from the well. In other embodiments, the camera track may be designed to achieve greater or shorter lengths to meet the needs of a particular application.

A specific embodiment of the present invention is an assembly for making observations down a wellbore, comprising a tubular body having an interior cavity, the tubular body having a longitudinal axis and an outer diameter; a first track connected to the tubular body and positioned in the interior cavity, the first track is oriented substantially parallel to the longitudinal axis; a second track movable along the first track; a camera movable along the second track; a bladder having an interior volume and an outer diameter, wherein the camera and at least a portion of the second track are positioned in the interior volume; wherein in a first position, the camera, the second track and the bladder are positioned inside of the interior cavity; and wherein in a second position, the camera, at least a portion of the second track, and at least a portion of the bladder are positioned outside of the interior cavity, and the outer diameter of the bladder is larger than the outer diameter of the tubular body.

In other embodiments of the present invention, the wireline adaptable mandrel is designed to house other tools. For example, cleaning implements, fishing tools, sensors, detectors, logging tools, and other tools may be attached to the telescoping track and/or camera track. In some embodiments, the reservoir and/or expandable bladder will not be utilized or present. Embodiments of the present invention may also be used in the downstream and midstream sectors, as well as in non-oilfield sectors. These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the invention. Moreover, references made herein to "the invention" or aspects thereof should be understood to mean certain embodiments of the invention and should not necessarily be construed as limiting all embodiments to a particular description. The invention is set forth in various levels of detail in the Summary of the Invention as well as in the attached drawings and Detailed Description and no limitation as to the scope of the invention is intended by either the inclusion or non-inclusion of elements, components, etc. in this Summary of the Invention. Additional aspects of the invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Figure 1:
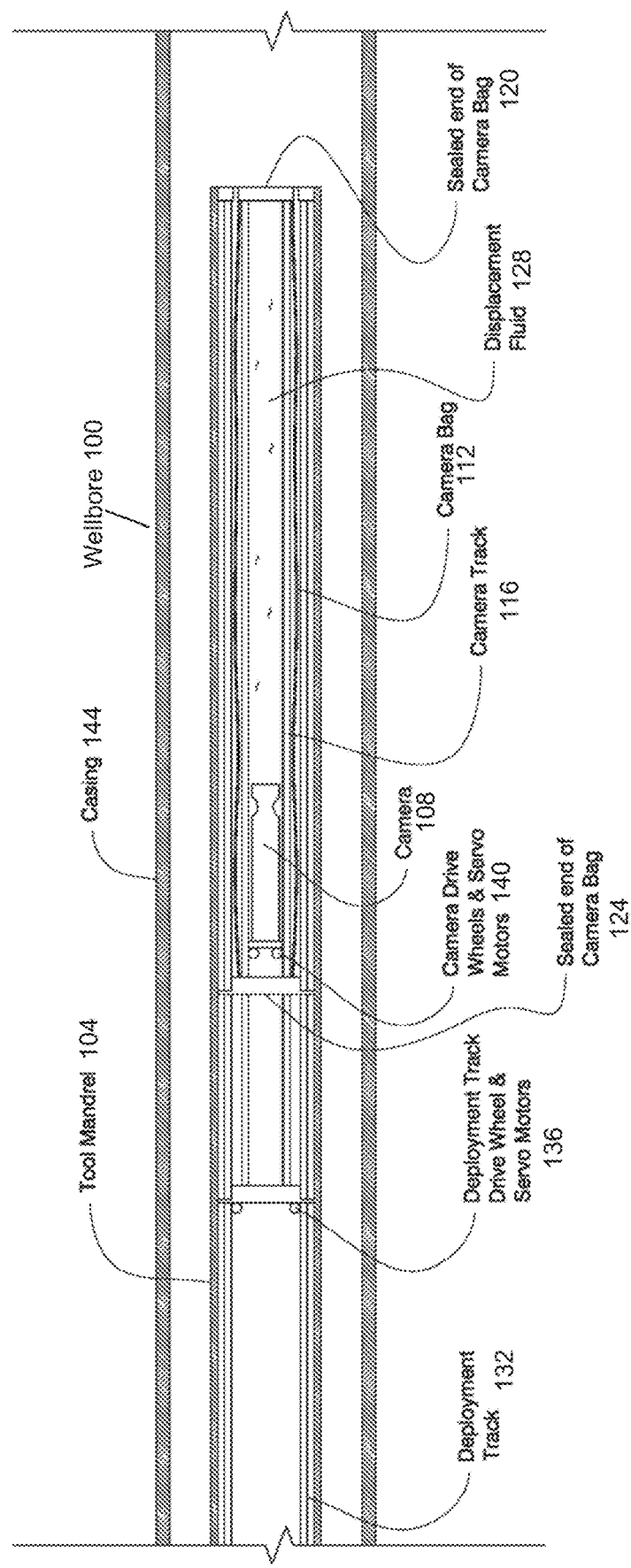
FIG. 1 is a cross-sectional view of a mandrel having a telescoping camera in a pre-deployment state in accordance with an embodiment of the present invention.

Now referring to FIG. 1, a cross-sectional view of a mandrel having a telescoping camera is provided. The mandrel 104 is a tubular structure that can be deployed downhole by wire and/or as part of a larger tubular structure such as a drill string. In some embodiments, the mandrel 104 may be deployed on electric line, slickline, coiled tubing, intelligent coiled tubing, and pipe. In some embodiments, power is provided via electrical conduit, fiber optics, or battery. The mandrel 104 has an interior cavity that houses various components of wellbore observation system. A deployment track 132 is positioned in the interior cavity, and a camera track 116 is moveable relative to the deployment track 132. As illustrated, drive wheels and servo motors 136 can move the camera track 116 relative to the deployment track 132.

Next, a camera 108 is moveable relative to the camera track 116, and again, drive wheels and servo motors 140 can move the camera 108 relative to the camera track 116. A camera bag or bladder 112 extends around at least a portion of the camera track 116 such that the camera 108 is positioned in the camera bag 112. The camera bag 112 houses a displacement fluid 128 that the camera 108 can make observations through. The camera bag 112 is operatively connected to a reservoir of additional displacement fluid 128. In some embodiments, camera bag 112 further comprises seals 120 and 124 at one or both ends of camera bag 112. In other embodiments, seals 120 and 124 may be removable or not present. In the pre-deployment state shown in FIG. 1, the camera 108, the camera track 116, and the camera bag 112 are positioned within the interior cavity of the mandrel 104.

Figure 2:
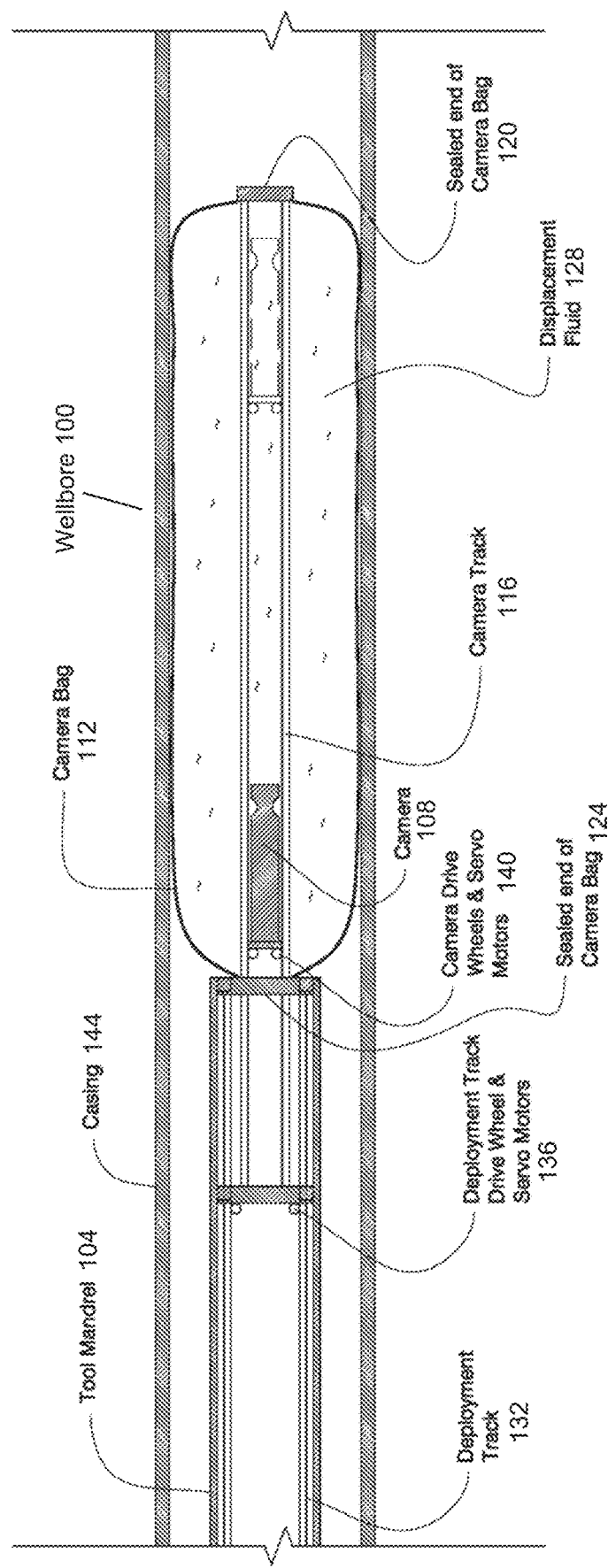
FIG. 2 is a cross-sectional view of a mandrel having a telescoping camera in a post-deployment state in accordance with an embodiment of the present invention.
Figure 3:
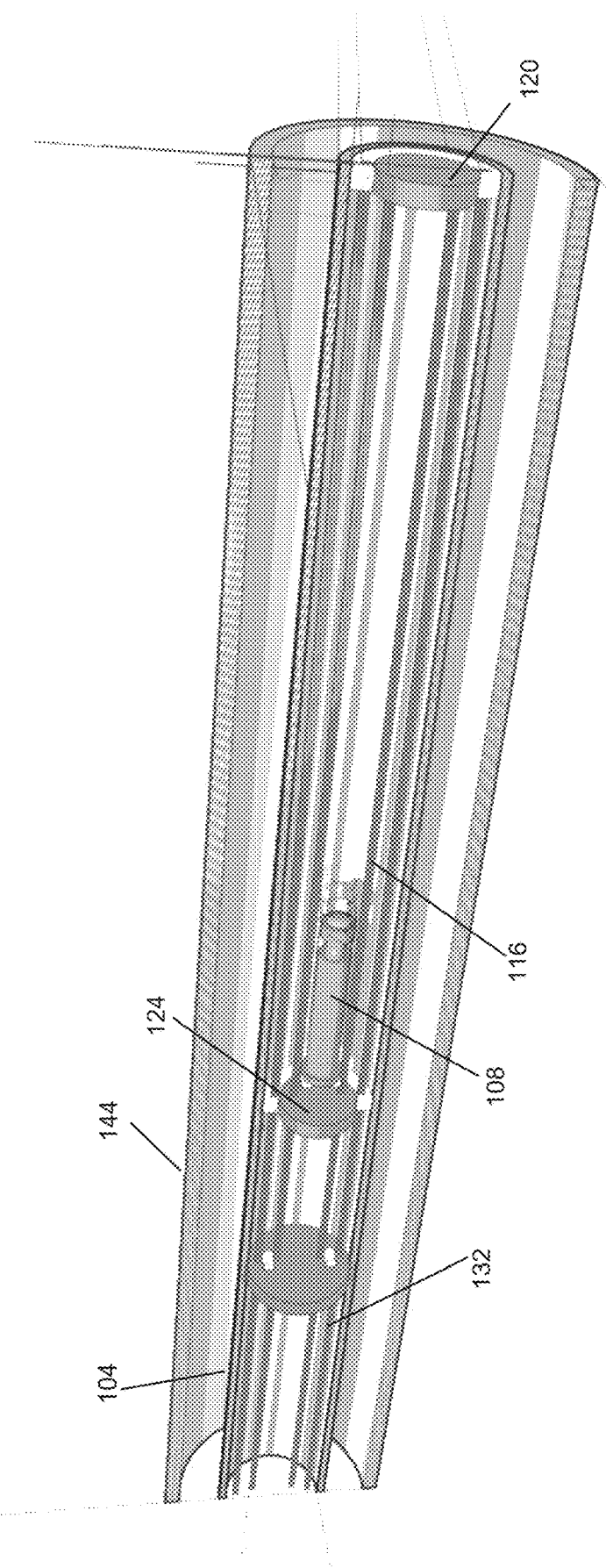
FIG. 3 is a perspective, cross-sectional view of a mandrel having a telescoping camera in a pre-deployment state in accordance with an embodiment of the present invention.
Figure 4:
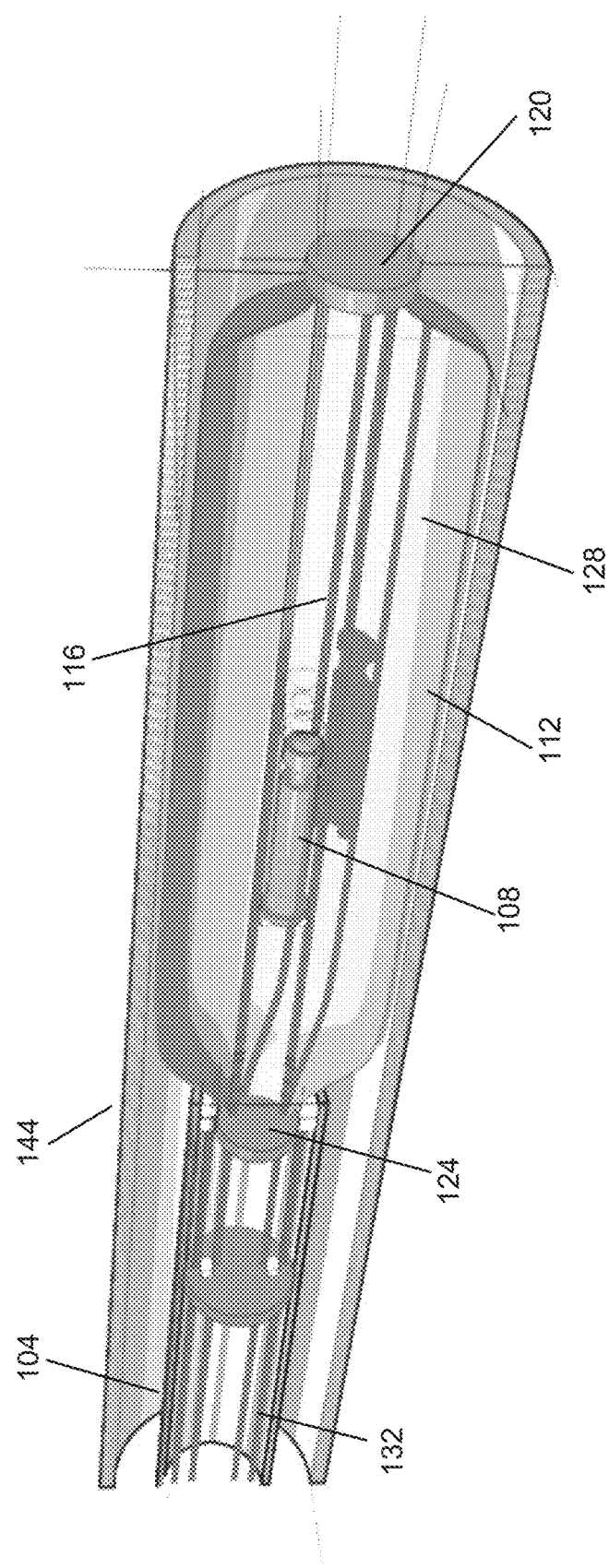
FIG. 4 is a perspective, cross-sectional view of a mandrel having a telescoping camera in a post-deployment state in accordance with an embodiment of the present invention.

Now referring to FIG. 2, a cross-sectional view of a mandrel having a telescoping camera in a post-deployment state is provided. Here, the camera track 116 moves longitudinally relative to the deployment track 132, and at least a portion of the camera track 116 is positioned outside of the interior cavity of the mandrel 104. Also, the camera bag 112 is at least partially positioned outside of the interior cavity of the mandrel 104, and an additional volume of displacement fluid 128 from the reservoir is added to the camera bag 112 such that the camera bag 112 has an outer diameter that is larger than the outer diameter of the mandrel 104. As a result, the camera bag 112 partially or wholly, i.e., at least partially, contacts the interior surface of the wellbore 100, which can be the wellbore itself, a casing 144, a production tubular, etc. The camera 108 can move along the camera track 116 and make observations of the interior surface of the wellbore 100. Now referring to FIGS. 3 and 4, these figures show alternative views of the telescoping camera in a pre-deployment state and a post-deployment state, respectively.

A camera 108 can be selected to meet the needs of a particular application, and those skilled in the art will appreciate that many different cameras can be utilized with the present invention. In some embodiments, the camera 108 may permit greater than 180-degree views. In some embodiments of the present invention, multiple cameras may be used to provide different views, e.g. different angles or levels of zoom, at the same time, or to simultaneously observe the entire circumference of the internal diameter of the wellbore. The camera 108 may also have the ability to pan, tilt, and zoom. In some embodiments, the camera is capable of recording prior to the expansion of the camera bag 112 or the extension of the deployment track 132 or camera track 116. It will be appreciated by those skilled in the art that the camera bag 112 and camera 108 of the present invention permit visibility in even high turbidity fluids such as oil-based mud with no need for displacing the high turbidity fluids in the wellbore with a clear fluid to provide clarity.

Embodiments of the present invention may also be used in midstream, downstream, and non-oilfield sectors, with or without a camera 108, a camera bag 112, and/or a camera track 116.

For example, a cleaning implement may be coupled to the deployment track 132 or the camera track 116, enabling the cleaning implement to be moved longitudinally relative to the mandrel 104 to clean the wellbore 100. Fishing tools, sensors, detectors, and other logging and diagnostic equipment may be coupled to the deployment track 132 or camera track 116 in other embodiments. Other embodiments of the present invention may be utilized in non-upstream applications, for example, where the observation of the interior of tubulars is required, such as sewer, water, etc. applications.

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items.

Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the invention. The embodiments described herein above are further intended to explain best modes of practicing the invention and to enable others skilled in the art to utilize the invention in such a manner, or include other embodiments with various modifications as required by the particular application(s) or use(s) of the invention. Thus, it is intended that the claims be construed to include alternative embodiments to the extent permitted by the prior art.

What is claimed is:

1. An assembly for making observations down a wellbore, comprising:
    a tubular body having an interior cavity, a longitudinal axis, and an outer diameter; and
    a bladder having an interior volume and an outer diameter, wherein at least a portion of a camera is positioned within the interior volume and movable along the longitudinal axis,
        wherein in a first position, the camera and the bladder are positioned inside of the interior cavity, and
        wherein in a second position, the camera and at least a portion of the bladder are positioned outside of the interior cavity, and the outer diameter of the bladder is larger than the outer diameter of the tubular body.

2. The assembly of claim 1, wherein the interior volume of the bladder includes a displacement fluid.

3. The assembly of claim 2, further comprising a reservoir coupled to the bladder for holding the displacement fluid.

4. The assembly of claim 1, wherein the bladder further comprises seals on either end.

5. The assembly of claim 1, wherein in the second position the bladder at least partially contacts an interior surface of the wellbore.

6. The assembly of claim 5, wherein the bladder displaces substantially all of a fluid in the wellbore between the camera and an interior surface of the wellbore.

7. The assembly of claim 1, wherein at least one of the camera, one or more sensors, or other diagnostic equipment are configured to traverse the bladder once the bladder is inflated with a displacement fluid.

8. A method of making observations down a wellbore, comprising:
    providing a tubular body having an interior cavity, a longitudinal axis, and an outer diameter;
    providing a bladder having an interior volume, an outer diameter, and at least a portion of a camera positioned within the interior volume and movable along the longitudinal axis, wherein in a first position, at least a portion of the camera and at least a portion of the bladder are positioned inside of the interior cavity;
    moving the camera into a second position that is different from the first position by:
        increasing a volume of the bladder such that the outer diameter of the bladder is larger than the outer diameter of the tubular body, and
        traversing the camera to a desired location within the bladder.

9. The assembly of claim 8, further comprising inflating the bladder by adding a displacement fluid to the bladder.

10. The method of claim 8, further comprising observing an interior surface of the wellbore with the camera through the displacement fluid and the bladder.

11. The method of claim 8, wherein the tubular body further comprises a reservoir coupled to the bladder for holding a displacement fluid.

12. The method of claim 8, wherein the bladder further comprises seals on either end.

13. The method of claim 8, further comprising inflating the bladder such that the bladder at least partially contacts an interior surface of the wellbore when inflated.

14. The method of claim 8, further comprising displacing, by the bladder, substantially all of a fluid in the wellbore between the camera and an interior surface of the wellbore.

15. An assembly for making observations down a wellbore, comprising:
    a tubular body having an interior cavity; and a bladder having an interior volume and an outer diameter,
wherein at least a portion of a camera is positioned within the interior volume and movable along a longitudinal axis of the tubular body,
wherein in a first position, the camera and the bladder are positioned inside of the interior cavity, and
wherein in a second position, the camera and at least a portion of the bladder are positioned outside of the interior cavity, and the outer diameter of the bladder is larger than the outer diameter of the tubular body.

16. The assembly of claim 15, wherein the interior volume of the bladder includes a displacement fluid.

17. The assembly of claim 16, wherein in the second position, a first volume of the displacement fluid within the bladder is greater than a second volume of displacement fluid within the bladder when the bladder is in the first position.

18. The assembly of claim 15, wherein in the second position the bladder at least partially contacts an interior surface of the wellbore.

19. The assembly of claim 15, wherein the bladder displaces substantially all of a fluid in the wellbore between the camera and an interior surface of the wellbore.

20. The assembly of claim 15, wherein at least one of the camera, one or more sensors, or other diagnostic equipment are configured to traverse the bladder once the bladder is in the second position.

\* \* \* \* \*